United States Patent Office 3,055,863
Patented Sept. 25, 1962

3,055,863
POLYETHYLENE STABILIZED WITH 6,6'-METH-
YLENE-BIS-(2-ISOBORNYL-4-METHYLPHENOL)
Georg Keicher, Gersthofen, near Augsburg, and Ernst
Stark, Frankfurt am Main, Germany, assignors to
Farbwerke Hoechst Aktiengesellschaft vormals Meister
Lucius & Brüning, Frankfurt am Main, Germany, a
corporation of Germany
No Drawing. Filed June 26, 1956, Ser. No. 593,809
Claims priority, application Germany July 2, 1955
1 Claim. (Cl. 260—45.95)

The present invention relates to a process for the stabilization of polyethylene, particularly of polyethylene prepared by a low pressure process.

It is known that monohydric mononuclear phenols wherein at least one nuclear hydrogen atom is substituted by alkyl radicals, preferably methyl groups, and condensation products from such compounds with aldehydes such as formaldehyde can be used for improving natural and synthetic caoutchouc or mixtures thereof. Monohydric mononuclear alkylated phenol compounds wherein at least one nuclear hydrogen atom is substituted by cyclic terpene radicals as well as reaction products from such compounds with aldehydes have also been used to this end.

Various attempts have been made to avoid the undesired increase in viscosity occurring in the work up of high pressure polyethylene in contact with air. For example, monohydric mononuclear phenols with one or several alkyl side chains and condensation products from such compounds with aldehydes, preferably formaldehyde, have been added to the polyethylene. A great part of these compounds, however, produce a relatively strong discoloration of the plastic and are not suitable for use if the light color of the polyethylene is to be preserved.

Belgian Patent 533,362 which corresponds to German patent applications Z 3799, Z 3862 and Z 3882 IVc/39c, Belgian Patent 534,792 which corresponds to the German patent application Z 3941 IVc/39c and Belgian Patent 534,888 which corresponds to German patent application Z 3942 IVc/39c (all filed in the name of Karl Ziegler) describe a process for the preparation of high molecular polyethylene. According to these patents, ethylene is brought into contact with a mixture of an organo-metal compound of the alkali metals, alkaline-earth metals or earth metals and a salt of titanium, zirconium, hafnium, vanadium, niobium, chromium, molybdenum, tungsten, thorium or uranium under relatively mild conditions as regards pressure and temperature. Mixtures of organometal compounds with titanium tetrahalide or zirconium tetrahalide have proved particularly suitable for the polymerization.

Now we have found that the properties of polyethylene, preferably low pressure polyethylene obtained by the above mentioned process, can be improved by adding to the polyethylene monohydric mononuclear phenol compounds in which at least one nuclear hydrogen atom is substituted by a cyclic terpene radical or the condensation products from these compounds with aldehydes, preferably formaldehyde. Derivatives of cresols and xylenols containing at least one isobornyl group in the molecule are especially suitable.

The above mentioned stabilizers are added in a concentration of 0.01% to 4%, preferably 0.02% to 2%, calculated upon the weight of the polyethylene.

Mixtures of the said compounds can, of course, also be used for improving polyethylene by the process of the invention.

As compounds adapted for use in accordance with this invention there may be mentioned, for example: isobornyl-o-cresol, isobornyl-1.2.4-xylenol, di - isobornyl - p - cresol, 6.6'-methylene-bis-(2-isobornyl-4-methylphenol); in many cases a mixture of the position isomers of the isobornyl compounds is used. This does, however, not mean that according to the present invention only the expressly mentioned compounds are suitable for improving polyethylene; they have only been listed to demonstrate the chemical structure of the stabilizers according to the invention. It is obvious to those skilled in the art that chemical compounds of similar or analogue structure can also be used which are covered by the general definition given above.

In polyethylene to which substances according to the invention have been added signs of aging, such as becoming brittle and increased crystallinity under the action of light and moderate heat, are found in a considerably less degree than in nonstabilized polyethylene. The additives according to the invention offer further essential advantages. Even with addition of only 0.05% a good result can be obtained. The color of the plastic is changed only slightly if at all and the excellent electric properties of low pressure polyethylene remain practically unchanged.

By partial hydrogenation of the additives according to the invention the stabilizing effect can be enhanced to a certain extent. The absorption of hydrogen is within the range of 15% to 30%, calculated upon a quantitative hydrogenation of the conjugated double bonds of the benzene nucleus.

The following table shows that the additives according to the invention are considerably more effective than the known stabilizers. As factor of improvement there is indicated the number by which the time after which unstabilized low pressure polyethylene becomes brittle must be multiplied in order to obtain the time after which the samples containing additives according to the invention become brittle.

| Stabilizer, percent | Concentration | Factor of improvement |
|---|---|---|
| 0.2 | 2.6-di-tert.-butyl-p-cresol | 2 |
| 0.2 | p-Tert.-butylphenol | 4 |
| 0.2 | Isobornyl-o-cresol | 7–8 |
| 0.2 | Isobornyl-1.2.4-xylenol | ~26 |
| 0.2 | Isobornyl-1.2.4-xylenol (hydrogenated to the extent of 25%). | ~30 |
| 0.15 | 6.6'methylene-bis-(2-isobornyl-4-methylphenol). | ~50 |

As results from the above table, the isobornyl compounds are much superior to the known stabilizers. Their effect is still enhanced by partial hydrogenation.

It is of great importance that the additives be uniformly distributed in the polyethylene. This can be effected in known manner, for example on mills or in kneading machines. The additives of the invention can also be incorporated with the plastic in the form of a solution. The stabilizers can, of course, be also added during the polymerization.

In general, additives such as dyestuffs, pigments or fillers have no or only little influence upon the degree of the obtainable stabilization effect.

Finally it should be mentioned that polyhydric mononuclear terpene-substituted phenols, for example hydroquinone camphene compounds, also possess an excellent stabilizing action. However, when these substances are used for improving polyethylene, they often produce a dark coloration which can be removed only with difficulty.

The following examples serve to illustrate the invention but they are not intended to limit it thereto:

*Example 1*

Pulverulent low pressure polyethylene obtained, for example, as described in the above mentioned Belgian Patent 533,362 is spread out on a mill, which has been preheated to 135° C., and made into a 0.6-mm. thick sheet. 0.2% of practically colorless isobornyl-1.2.4-xylenol is applied to this sheet and incorporated therewith by thorough milling for 9 minutes. The sheet is removed, cut into strips and the latter are made into a 1-mm. thick sheet by using a press preheated to 155° C. (pressing pressure: 200 kg./cm.²; time of pressing: 6 minutes). When after cooling, the pressed sheet is cut into strips and the latter are heated at 120° C. in contact with air and then compared with samples of low pressure polyethylene which have been treated in the same manner but do not contain the above mentioned additive, it can be seen that the samples which contain the additive require about 19 times more time to become brittle.

*Example 2*

In a kneading machine which has been heated to 140° C., low pressure polyethylene is thoroughly plasticized for 7 minutes with 0.3% of di-isobornyl-p-cresol. The plastic material which is still warm is passed through a perforated disk and the thin strands so obtained are granulated by means of a rotating knife. In an extruder the granular material is made, at an average temperature of 135° C., into a thin band which is then made into a 2-mm. thick foil in a press. When samples are punched out of this foil and heated at 115° C. in contact with air, it can be seen that these samples require about 20 times more time to become brittle than samples of low pressure polyethylene which have been treated in the same manner (kneaded for 7 minutes, granulated, made into a band in an extruder and pressed) but do not contain the above mentioned additive.

*Example 3*

0.15% of 6.6'-methylene-bis-(2-isobornyl-4 - methylphenol) corresponding to the general formula

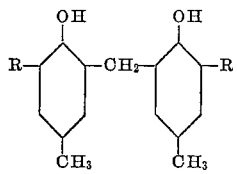

wherein R stands for isobornyl, is admixed to pulverulent low pressure polyethylene at room temperature in an effective stirring contrivance. The mixture is milled for 3 minutes on a mill preheated to 133° C. and the sheet so obtained is then removed. In a press which has been preheated to 160° C. the sheet so obtained is made into a 3-mm. thick pressed sheet and the latter is heated at 120° C. in contact with air. When the sheet is compared with a sample of low pressure polyethylene which has been treated in the same manner but does not contain the above mentioned additive, it can be seen that the sample containing the small addition of 0.15% of 6.6'-methylene-bis-(2-isobornyl-4-methylphenol) requires about 15 times more time to become brittle than the sample containing no additive.

We claim:

A new composition of matter comprising polyethylene having admixed therewith as a stabilizer 6.6'-methylene-bis-(2-isobornyl-4-methylphenol) corresponding to the general formula

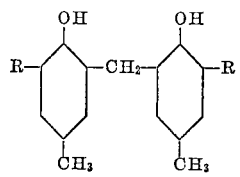

wherein R stands for isobornyl, said stabilizer being present in an amount of about 0.01–4% by weight, based on the weight of polyethylene, said polyethylene being produced by contacting ethylene with a catalyst formed by mixing an organo aluminum compound with a compound of a metal selected from the group consisting of transitional metals of groups IV–B, V–B and VI–B of the periodic table.

References Cited in the file of this patent

UNITED STATES PATENTS

| 2,537,636 | Kitchen | Jan. 9, 1951 |
| 2,606,886 | Amberg | Aug. 12, 1952 |
| 2,769,784 | Young et al. | Nov. 6, 1956 |

OTHER REFERENCES

Raff et al.: "Polyethylene," page 103, Interscience (1956). (Copy in Library.)